United States Patent
Iwamoto et al.

(10) Patent No.: US 7,535,698 B2
(45) Date of Patent: May 19, 2009

(54) CASE, PORTABLE INFORMATION EQUIPMENT USING THE SAME AND MANUFACTURING METHOD OF THE CASE

(75) Inventors: Akira Iwamoto, Osaka (JP); Jun Sato, Osaka (JP); Atsushi Murase, Osaka (JP)

(73) Assignee: Panasonic Corporation, Osaka (JP)

( * ) Notice: Subject to any disclaimer, the term of this patent is extended or adjusted under 35 U.S.C. 154(b) by 310 days.

(21) Appl. No.: 11/508,439

(22) Filed: Aug. 23, 2006

(65) Prior Publication Data

US 2007/0211418 A1    Sep. 13, 2007

(30) Foreign Application Priority Data

Mar. 7, 2006    (JP) .............................. 2006-060836

(51) Int. Cl.
*G06F 1/16* (2006.01)
(52) U.S. Cl. .............................. 361/679.55; 361/679.26
(58) Field of Classification Search .................. 361/683
See application file for complete search history.

(56) References Cited

U.S. PATENT DOCUMENTS

| | | | |
|---|---|---|---|
| D353,133 S * | 12/1994 | Yamada et al. | D14/325 |
| 6,426,870 B1 * | 7/2002 | Oross et al. | 361/683 |
| 6,922,335 B2 * | 7/2005 | Shimada et al. | 361/683 |
| 7,224,580 B2 * | 5/2007 | Shimada et al. | 361/681 |
| 2002/0126445 A1 * | 9/2002 | Minaguchi et al. | 361/683 |
| 2006/0232920 A1 * | 10/2006 | Miyamoto et al. | 361/683 |
| 2007/0041149 A1 * | 2/2007 | Homer et al. | 361/681 |

FOREIGN PATENT DOCUMENTS

| | | |
|---|---|---|
| JP | 09-062400 | 3/1997 |
| JP | 2003-204174 A | 7/2003 |

\* cited by examiner

*Primary Examiner*—Lisa Lea-Edmonds
(74) *Attorney, Agent, or Firm*—RatnerPrestia

(57) ABSTRACT

The case disclosed has a raised portion stepped upward convexly and a rib molded inside of the raised portions integrally. The case is disposed at a rear surface of a display unit of a portable information equipment.

7 Claims, 9 Drawing Sheets

CASE, PORTABLE INFORMATION EQUIPMENT USING THE SAME AND MANUFACTURING METHOD OF THE CASE

BACKGROUND OF THE INVENTION

1. Field of the Invention

The present invention relates to a portable information equipment such as a notebook computer or the like and particularly relates to a metallic case for use in the portable information equipment and a manufacturing method of the case.

2. Background Art

In recent years, the portable information equipment such as a notebook computer or the like has been made thinner and lighter to enhance the portability, the case forming an outer shell has also been made in a thinner profile. Meanwhile, the case has been made of a metallic material to improve mechanical strength, in order to protect electromagnetic interference (EMI) and to dissipate heat generated inside the equipment efficiently.

A conventional portable information equipment is described below with reference to the drawings. FIG. 7A shows an outward perspective view of a conventional portable information equipment in a state that a display unit is opened, and FIG. 7B shows the same in a state that the display unit is closed. FIG. 8A shows a cross-sectional view of the display unit taken along the line 8A-8A in FIG. 7B, and FIG. 8B shows the same taken along the line 8B-8B in FIG. 7B.

Display unit 32 is joined with body 31 of the equipment via hinge 33 which makes the both can be opened and closed. In display unit 32, a liquid crystal display drive (LCD drive; not shown) and LCD panel 36, which are components to form an LCD display device, are disposed between rear case 34 and front frame 35.

The portable information equipment has generally, as is called a note type or a book type, a thin box shape with a rectangular flat portion to put into a bag or the like suitably. Rear case 34 is made of a metallic material such as aluminum or the like to improve mechanical strength so as to protect EMI and to dissipate heat generated inside the equipment efficiently. To reduce weight of the equipment, especially in recent years, magnesium alloy having lower specific gravity and greater strength than aluminum is used to realize an utmost thin case thickness. The advance in thin-and-light design has increased further chances for the equipment to be carried around in a bag or the like. However, when a person carrying a bag gets on a crowded train, the bag receives a high pressure from outside. The pressure will be applied on display unit 32 of the equipment if packed in the bag. Measures have been studied variously to prevent thin walled rear case 34 from being deformed by the pressure to break LCD panel 36 housed therein. That is, Unexamined Japanese Patent Publication No. 2003-204174 discloses a technology that is to form a non-flat rear case 34 like a car-hood as shown in FIGS. 7B and 8A while a thin thickness is maintained. Additionally, Unexamined Japanese Patent Publication No. H09-62400 discloses a technology to provide the entire case surface with ribs. These structures improve the mechanical strength of rear case 34.

In some cases, however, even such structures cannot perfectly prevent LCD panel 36 from being broken. Therefore, rear case 34 is required to improve further its mechanical strength.

SUMMARY OF THE INVENTION

A case of the present invention has a raised portion stepped upward convexly and a rib disposed molded inside of the raised portion integrally. The case is used on a rear face of a display device of a portable information equipment. The configuration can contribute to improve a mechanical strength of the display unit including the display device and to prevent the display unit from being deformed by an external pressure. Since the mechanical strength against the external pressure is improved, the display device of the portable information equipment employing the case is hard to be damaged.

DETAILED DESCRIPTION OF THE INVENTION

Figure 1A:
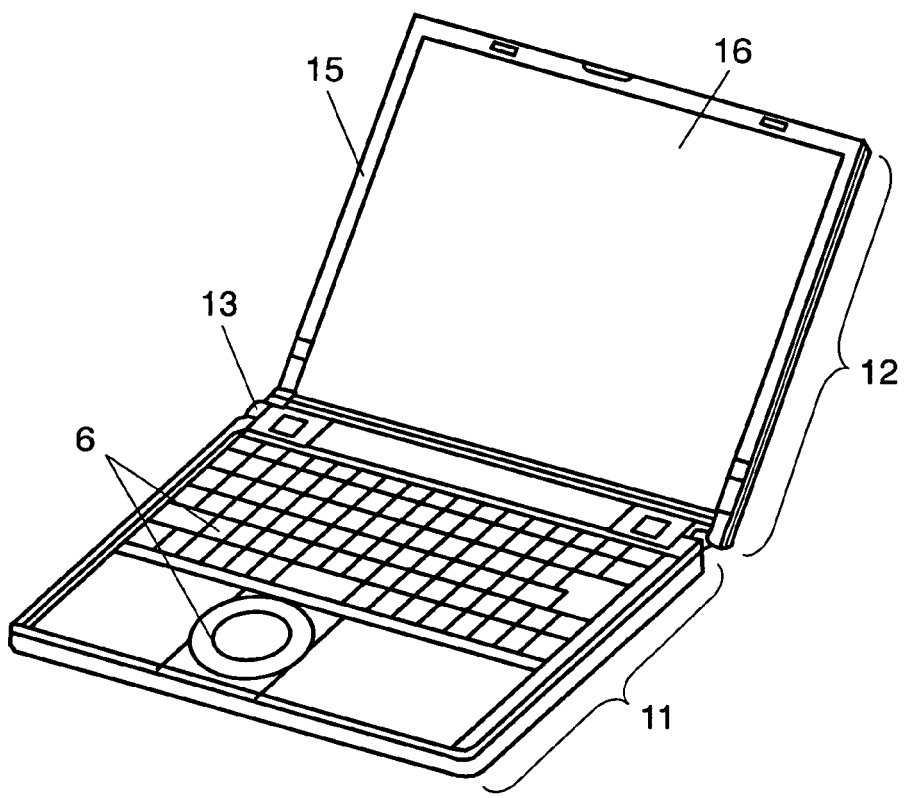
FIG. 1A shows an outward perspective view of a portable information equipment according to an exemplary embodiment of the present invention.
Figure 1B:
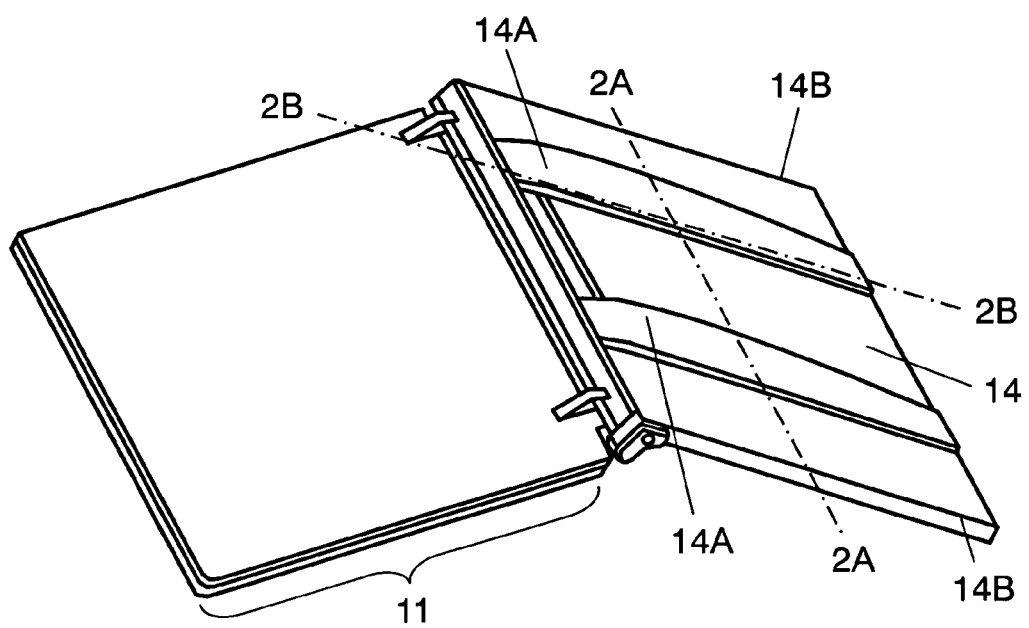
FIG. 1B shows an outward perspective view from the rear side of the portable information equipment shown in FIG. 1A.
Figure 1C:
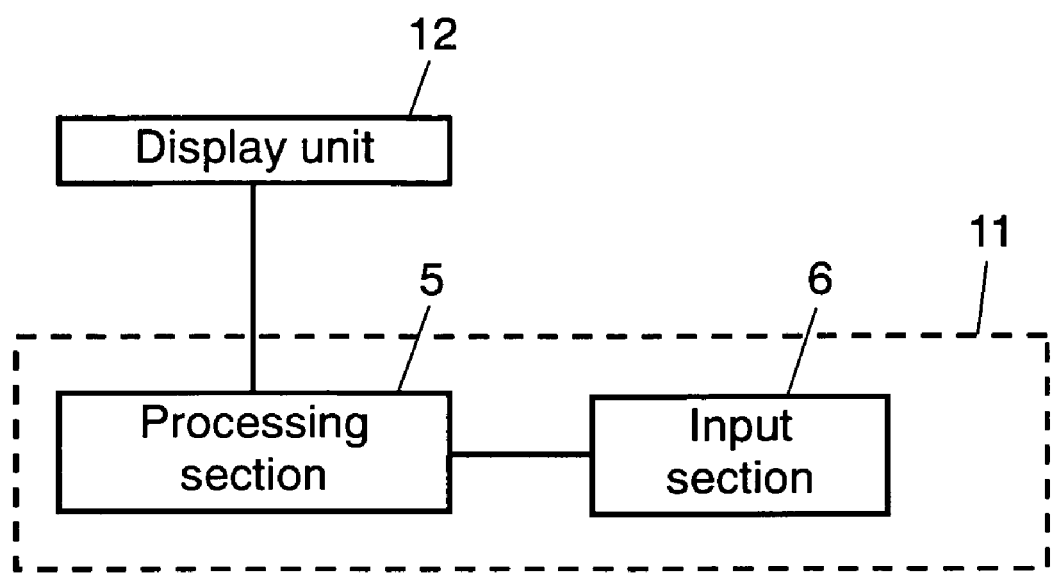
FIG. 1C is a block diagram showing the configuration of the portable information equipment according to the exemplary embodiment of the present invention.
Figure 2A:
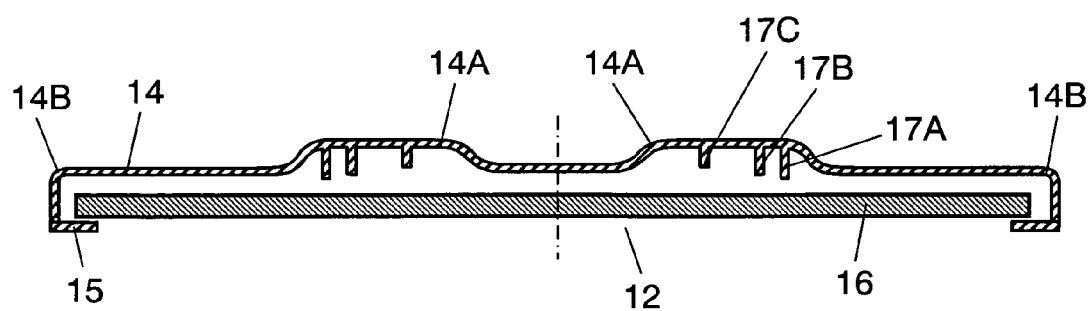
FIG. 2A shows a cross-sectional view of the display unit taken along the line 2A-2A of the portable information equipment shown in FIG. 1B.
Figure 2B:
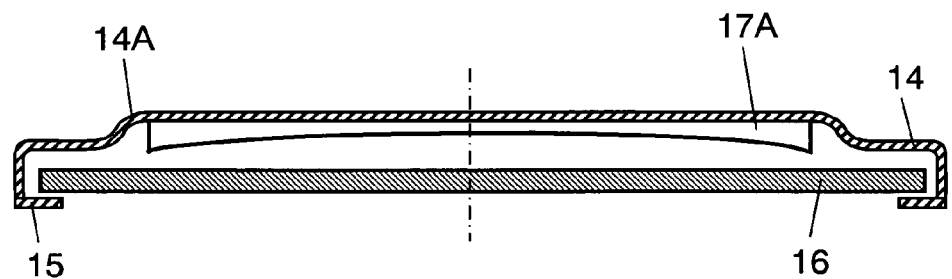
FIG. 2B shows a cross-sectional view of the display unit taken along the line 2B-2B of the portable information equipment shown in FIG. 1B.
Figure 3:
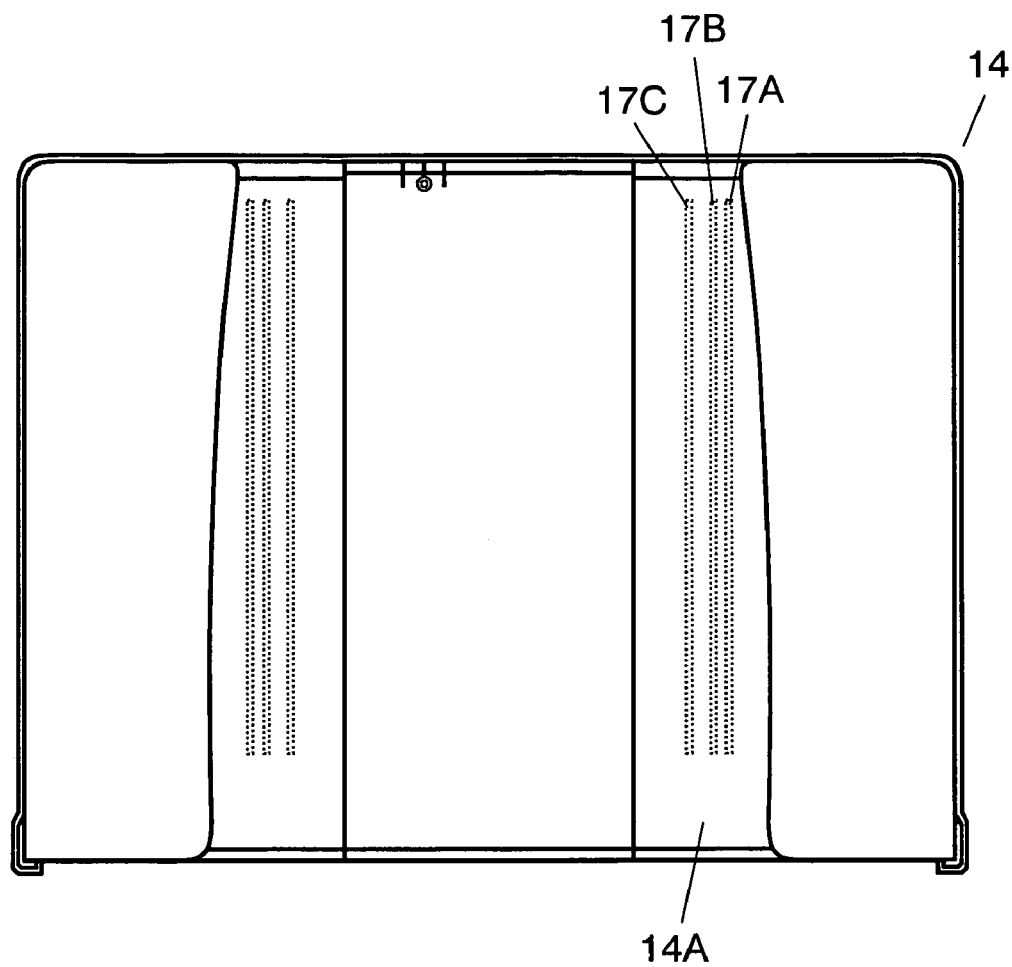
FIG. 3 shows a perspective plan view of a rear case of the display unit of the portable information equipment shown in FIG. 1B.
Figure 4A:
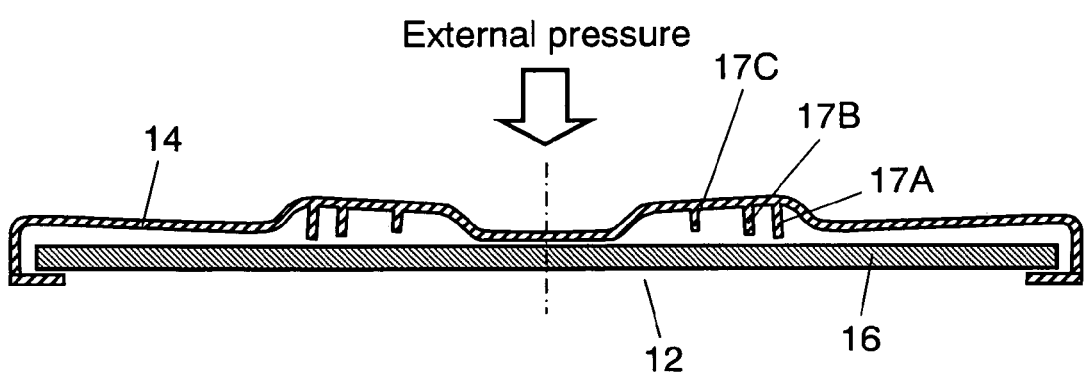
FIG. 4A shows a cross-sectional view of the display unit shown in FIG. 2A when applied a high pressure from outside.
Figure 4B:
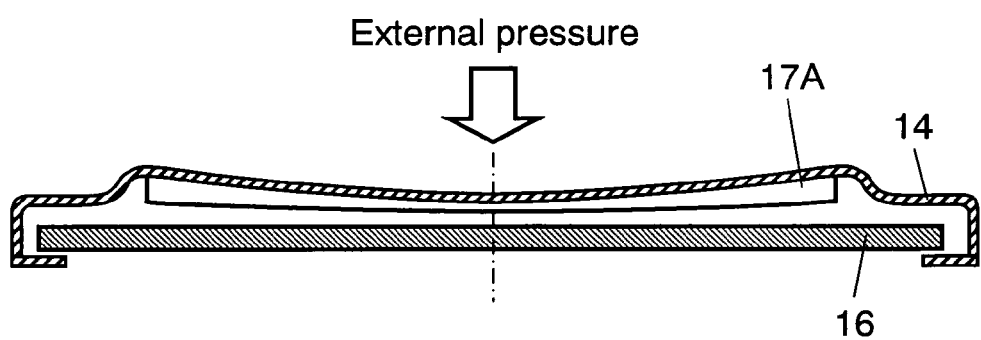
FIG. 4B shows a cross-sectional view of the display unit shown in FIG. 2B when applied a high pressure from outside.

FIG. 1A is a perspective view showing an appearance on the operating faces of the portable information equipment according to the exemplary embodiment of the present invention in a state that the display unit is opened. FIG. 1B is a perspective view showing an outward appearance from the rear side of the same. FIG. 1C is a block diagram showing the configuration of the portable information equipment according to the exemplary embodiment of the present invention. FIG. 2A shows a cross-sectional view of the display unit taken along the line 2A-2A shown in FIG. 1B, and FIG. 2B shows a cross-sectional view of the display unit taken along the line 2B-2B of the same. FIG. 3 shows a perspective plan view of the rear case of the display unit. FIGS. 4A and 4B show cross-sectional views of the display unit when applied with a high pressure from outside.

Display unit 12 is joined with body 11 of the equipment via hinge 13 which makes the both can be opened and closed as shown in FIGS. 1A and 1B. In display unit 12, an LCD drive (not shown) and LCD panel 16, which are components to form the display device, are disposed between rear case 14 and front frame 15 as shown in FIGS. 2A and 2B. A device other than an LCD panel such as a plasma display panel (PDP) or the like can be used for the display device.

Body 11 includes processing section 5 and input section 6 is mounted thereon as shown in FIG. 1C. Display unit 12 and input section 6 are connected with processing section 5. Processing section 5 includes a CPU, a memory, a hard disk or the like. Input section 6 is a keyboard, a touch-panel or a mouse-pad (or touch-pad) provided on body 11 as shown in FIG. 1A, an interface or media-drive to an external device, or a mouse connected via a cable. A touch-panel can be disposed on LCD panel 16 in display unit 12, for instance, to use as input section 6.

Rear case 14 has raised portions 14A stepped upward convexly. Each of raised portions 14A is formed in parallel with edge 14B of a short side of rear case 14 which is substantially rectangular solid-shaped. Namely, rear case 14 has a structure like a car-hood. Respective ribs 17A, 17B and 17C are disposed on a rear surface of raised portion 14A (inside raised portion 14A).

Ribs 17A, 17B and 17C are, molded to the raised portion 14A integrally, disposed perpendicularly to the surface of raised portion 14A and in parallel with edge 14B. The configuration can improve the mechanical strength of the short side of rectangular solid-shaped display unit 12 to prevent the deformation by the external pressure. In this way, a plurality of ribs provided on rear case 14 are preferable from the view point of improving the mechanical strength. Ribs 17A, 17B and 17C are preferably provided in a direction parallel with edge 14B. This can improve the mechanical strength of display unit 12 effectively that is fixed to body 11 with the long side.

The clearance between ribs 17A and 17B is preferably smaller than the clearance between ribs 17B and 17C as shown in FIG. 2A. That is, the three ribs are preferably disposed more densely as nearer to the outside from the center-line of rear case 14, or as nearer to the outside step of rear case 14. The protrusion heights of respective ribs 17A, 17B and 17C are preferably getting lower in this order. That is, the protrusion height of each rib is preferably lower as nearer to the inner side. Additionally, the side width of rib 17A is preferably narrower as nearer to the center as shown in FIG. 2B. That is, the protrusion height of rib 17A is preferably lower as nearer to the center of rear case 14. FIG. 2B illustrates rib 17A only, but the same shape can be applied for ribs 17B and 17C.

When rear case 14 is deformed by the external pressure, the amount of deformation is larger as nearer to the center of rear case 14 as shown in FIGS. 4A and 4B. Therefore, the clearance between rear case 14 and LCD panel 16 or an LCD drive (not shown) to show images on LCD panel 16 becomes smaller as nearer to the center of rear case 14. The clearance can be maintained in every configuration by the help of ribs 17A, 17B and 17C thus formed as described above. That is, each of the configuration can prevent LCD panel 16 and the LCD drive from colliding with ribs 17A, 17B and 17C to cause damaging or breaking due to the stress.

As described above, using empty spaces at the back of raised portions 14A of rear case 14 having a car-hood like structure, ribs 17A, 17B and 17C are disposed molded integrally to rear case 14. Ribs 17A, 17B and 17C are disposed perpendicularly to the surface of rear case 14 and in parallel with a short side of display unit 12. The configuration can improve the mechanical strength in the direction of the short side of display unit 12 to prevent the deformation by the external pressure.

If the clearance between rear case 14 and LCD panel 16 can be maintained, ribs may be disposed in the direction of a long side of display unit 12. The configuration can improve the mechanical strength in the direction of the long side of display unit 12. Depending on the size of display unit 12, ribs can be provided for instance in the direction of a diagonal line of a raised portion 14A instead of in parallel with edge 14B. There is no limitation in the number of rib though three ribs are described in the above example.

More than three raised portions 14A may be acceptable though two raised portions 14A are described in the example shown in FIG. 3. Only one raised portion 14A may also be acceptable. In any case, a plurality of ribs are preferably disposed more densely as nearer to the outer side from the center of rear case 14. The protrusion height of ribs is preferably lower as nearer to the inner side. The protrusion height of each rib is preferably lower as nearer to the center of rear case 14.

Figure 5A:
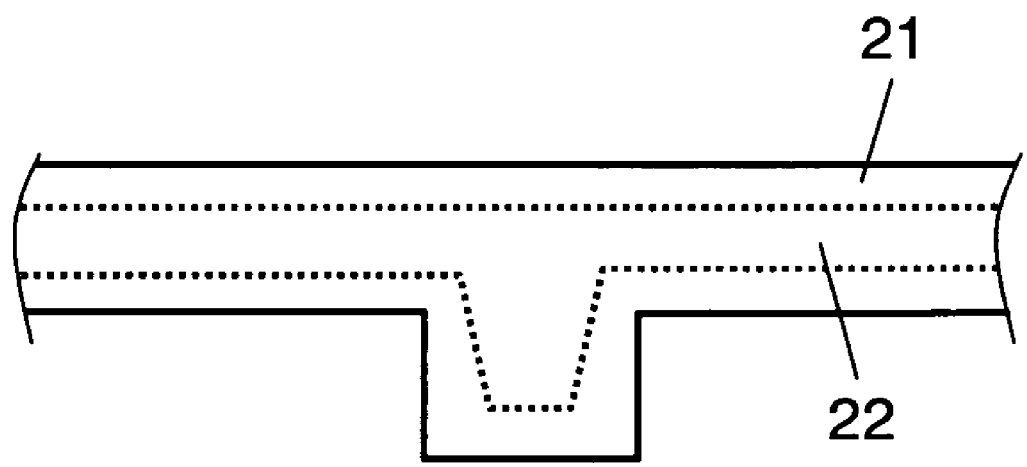
FIGS. 5A and 5B illustrate a reject phenomena called a "shrink mark" that occurs in mold-manufacturing.
Figure 5B:
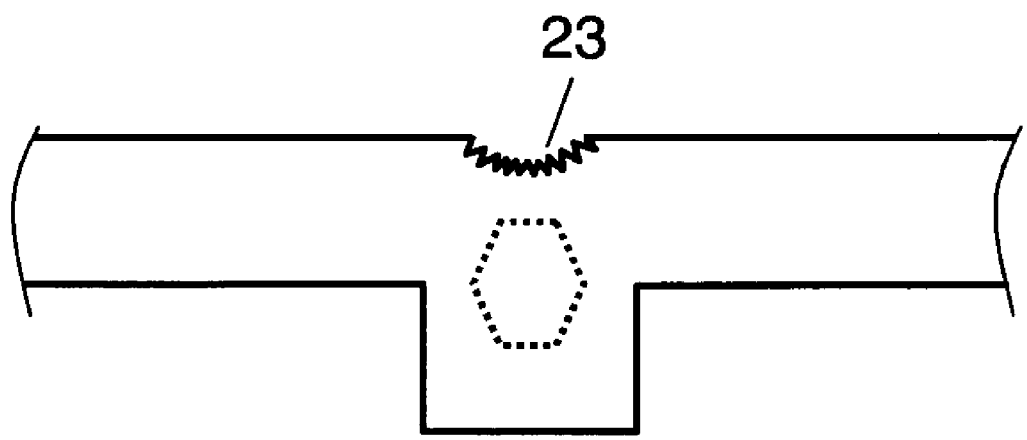

A manufacturing method of rear case 14 with ribs 17A, 17B and 17C is described hereinafter. A reject phenomenon called a "shrink mark" is described first. FIGS. 5A and 5B illustrate the reject phenomenon called the shrink mark that occurs in manufacturing molded products.

The shrink mark means a dent like a dimple formed on a surface of a molded product. The molded product changes greatly in volume in a solidifying period being influenced by pressure and temperature. The cooling rate for molded product 21 to solidify differs in portions. Surfaces cool down rapidly. On the contrary hot portion 22 is left internally, especially in an internal thick portion as shown in FIG. 5A. When heat tends to accumulate in this way, the material will solidify slowly under a low pressure and will shrink into a smaller volume. This affects greatly a dimensional stability of molded product 21. Dent 23 thus occurs as shown in FIG. 5B. Followings are said to be the two main factors of the shrink mark.

(1) Product Design

The molded product is basically considered that the product tends to have an equalized thickness in forming a shape. The shrink mark is a phenomenon which occurs when a resin or a metal molten in a high temperature does not solidify in a same cooling rate partially as described before, proving that the above consideration is true. If there are a portion of 2 mm thick and a portion of 4 mm thick in thickness, for instance, the portion of 4 mm thick will tend to delay in solidifying. That is, the shrink mark tends to occur in an intersection of portions with different thickness.

(2) Molding Condition

In molding operation, a cavity (a mold void) is filled with a high-temperature molten resin or metal. Usually, the material that will contract while cooling down is pressed on into every cavity corner by applying a hold pressure. The shrink mark tends to occur when the hold pressure is low. Taking into account the outcome of molded products, the molding condition is determined in this process to balance the cooling time and the hold pressure. The shrink mark will tend to occur if the cooling time including the time to apply the hold pressure is tried to shorten, though every product is generally required to be manufactured in a short period of time.

Figure 6A:
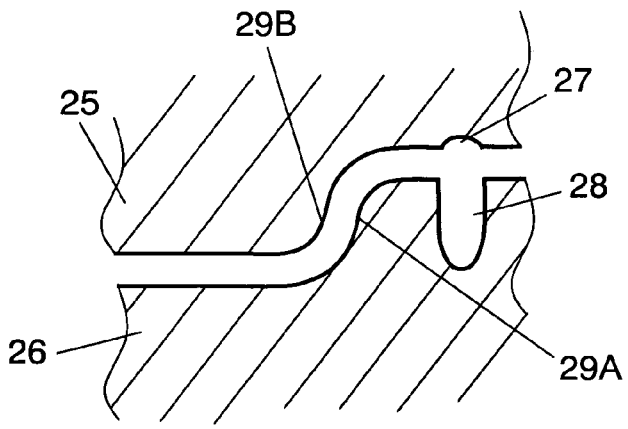
FIG. 6A shows a cross-sectional view of an essential part of a mold to form the rear case shown in FIG. 2A.
Figure 6B:
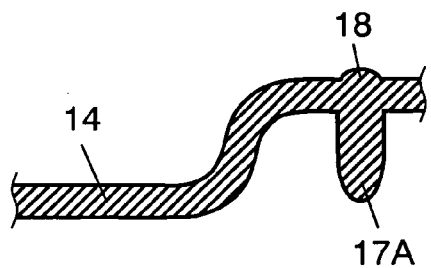
FIGS. 6B to 6D illustrate cross-sectional views of an essential part of the mold shown in FIG. 2A to explain the manufacturing of the rear case.
Figure 6C:
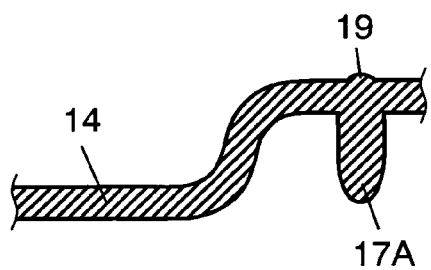
Figure 6D:
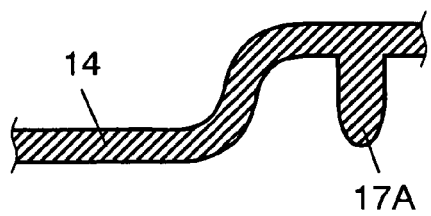
Figure 7A:
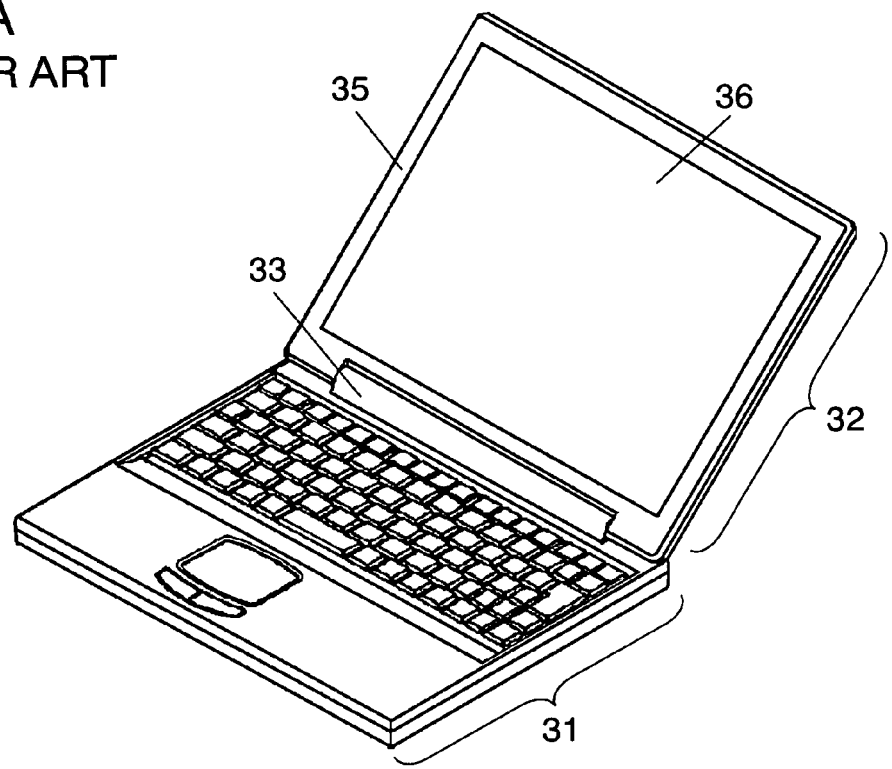
FIG. 7A shows an outward perspective view of a conventional portable information equipment in a state that a display unit is opened.
Figure 7B:
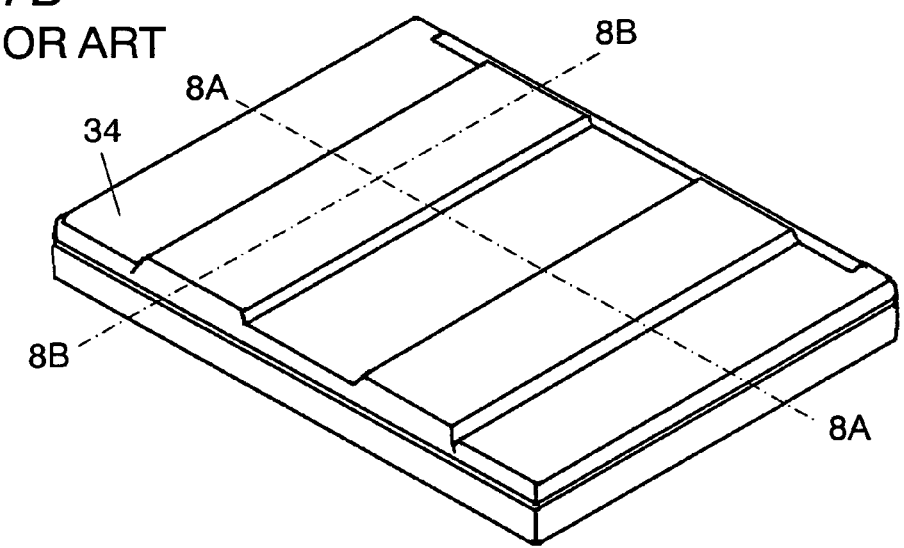
FIG. 7B shows an outward perspective view of the portable information equipment shown in FIG. 7A in a state that the display unit is closed.
Figure 8A:
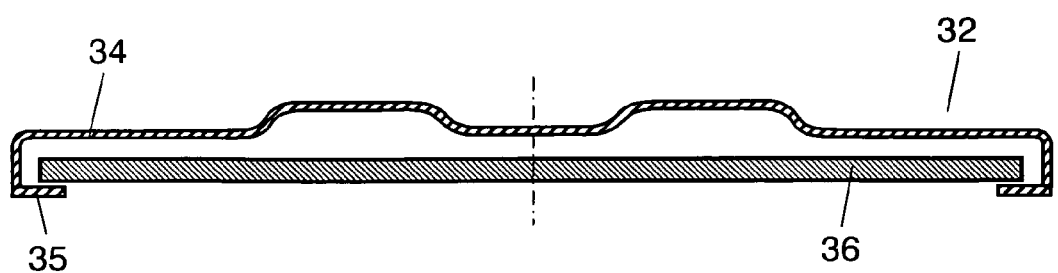
FIG. 8A shows a cross-sectional view of the display unit taken along the line 8A-8A in FIG. 7B.
Figure 8B:
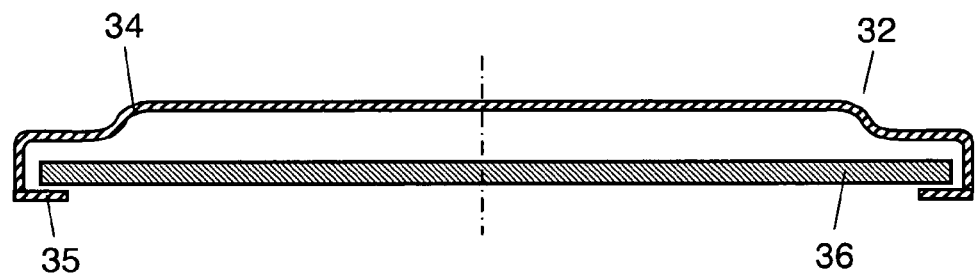
FIG. 8B shows a cross-sectional view of the display unit taken along the line 8B-8B in FIG. 7B.

A molding method of rear case 14 using magnesium alloy is described hereinafter with reference to FIGS. 6A to 6D. FIG. 6A shows a cross-sectional view of an essential part of a mold to form rear case 14, and FIGS. 6B to 6D illustrate cross-sectional views of essential parts in manufacturing steps to form rear case 14. States of just after molding, after cooling, and after surface polishing are shown in FIGS. 6B, 6C and 6D, respectively. Now, rib 17A is described as a representative.

Rib 17A is disposed molded integrally perpendicularly to the surface of rear case 14. Rib 17A, however, has a large width (thickness) with respect to the case thickness. Therefore, the shrink mark caused mainly by aforementioned factor (1) occurs in the solidifying process of high-temperature molten magnesium alloy in the mold. On the outer surface of raised portions 14A of rear case 14, a shrink mark of rib 17A disposed on the inner surface appears as a groove-like trace. Although such a trace can be erased by a polishing, the polishing to erase the trace like a groove will inevitably decrease thickness of rear case 14, causing a decrease in the mechanical strength. The production process will increase accordingly.

Therefore, the mold should be designed taking into account the portion where the shrink mark will occur beforehand as shown in FIG. 6A. The amount (depth) of shrink mark can be determined experimentally by a ratio of the thickness of raised portion 14A of rear case 14 to the width (thickness) of rib 17A. Based on the experimental results, cavity 27 is provided in upper mold half 25 on the opposite side of rear case 14 where rib 17A is provided so as to form mound 18, taking into account the amount of thickness loss due to the shrink mark as shown in FIG. 6B. At this time, a little bit larger amount than the thickness loss reduces amount variation of mounds 18. Sometimes, however, trace 19 of mound 18 remains as shown in FIG. 6C. Trace 19 can be erased easily by a surface polishing after the molding, which does not cause any decrease in the thickness of rear case 14 like in the case of polishing the groove-like trace due to the shrink mark.

As described above, the material of molten magnesium alloy is poured between upper mold half 25 and lower mold half 26 to mold rear case 14. First step 29A to form raised portion 14A and groove 28 to form rib 17A in an upper side (to the center) than first step 29A are provided on lower mold half 26. Second step 29B to form raised portion 14A and cavity 27 to form mound 18 at the back surface corresponding to the position of rib 17A in an upper side (to the center) than second step 29B are provided on upper mold half 25. Poured molten alloy is cooled down to solidify before upper mold half 25 and lower mold half 26 are removed to obtain rear case 14 with no shrink mark.

As described in the above exemplary embodiment, the mechanical strength of rear case 14 is improved further by rib 17A (rib 17B and 17C) utilizing the car-hood structure. Moreover, factors that hamper moldability such as shrink mark which occurs in manufacturing molded products are restrained, enabling rear case 14 to have a high resistance to external pressures.

Although molding a metallic material of magnesium alloy is mainly described in the above, resins can be the substitute for the material.

Additionally, although the case of a notebook computer which consists of two flat boxes, body 11 and display unit 12, joined together by a hinge is described in the above, the case can also be used for a rear case of one flat box-shaped notebook computer which carries a touch-panel instead of display unit 12 to use as a keyboard and has an LCD display device on body 11.

Additionally, although the case for a portable information equipment is described using a notebook computer as an example, the case is not limited to use for a notebook computer only. The structure mentioned above can be applied to other kinds of portable equipment such as a DVD player with a display device, a measuring equipment and a car navigation system.

As described above, the case for the portable information equipment of the present invention has ribs which is molded integrally to the rear case, and disposed perpendicularly to the surface of the rear case by using empty spaces at the back of raised portions of rear case having a car-hood like structure. The configuration can further improve the mechanical strength of the display unit to prevent the deformation by the external pressure, and is useful especially for metallic cases for the portable information equipment.

What is claimed is:

1. A case disposed at a rear surface of a display unit of a portable information equipment, the case comprising:
   a raised portion stepped upward convexly away from the rear surface of the display unit; and
   a rib integrally molded inside of the raised portion between the raised portion and the rear surface of the display unit, the rib configured to avoid contact with the rear surface of the display unit.

2. The case according to claim 1, wherein the rib is one of a plurality of ribs and the plurality of ribs are molded inside of the raised portion integrally.

3. The case according to claim 2, wherein the case is formed substantially in an outward shape of a rectangular solid and the plurality of ribs are disposed substantially in a direction parallel with an edge of an outer surface of the case.

4. The case according to claim 3, wherein the plurality of ribs includes at least a first, second and third rib,
   the second rib is disposed between the first and second ribs,
   the third rib is disposed between the second rib and a center line of the case, and
   a distance between the first and second ribs is smaller than a distance between the second and third ribs.

5. The case according to claim 3, wherein a protrusion height of a center portion of each of the plurality of ribs is lower than a protrusion height of an edge portion of each of the ribs.

6. The case according to claim 1, wherein a protrusion height of a center portion of the rib is lower than a protrusion height of an edge portion of the rib.

7. A portable information equipment comprising:
   A) a processing section;
   B) an input section connected to the processing section; and
   C) a display unit connected to the processing section having;
      C-1) a display panel; and
      C-2) a case disposed on a rear surface of the display panel including;
         C-2-1) a raised portion stepped upward convexly away from the rear surface of the display panel; and
         C-2-2) a rib integrally molded inside of the raised portion between the raised portion and the rear surface of the display panel, the rib configured to avoid contact with the rear surface of the display panel.

* * * * *